(12) United States Patent
Gao et al.

(10) Patent No.: US 11,537,792 B2
(45) Date of Patent: Dec. 27, 2022

(54) PRE-TRAINING METHOD FOR SENTIMENT ANALYSIS MODEL, AND ELECTRONIC DEVICE

(71) Applicant: BEIJING BAIDU NETCOM SCIENCE AND TECHNOLOGY CO., LTD., Beijing (CN)

(72) Inventors: Can Gao, Beijing (CN); Hao Liu, Beijing (CN); Bolei He, Beijing (CN); Xinyan Xiao, Beijing (CN); Hao Tian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 315 days.

(21) Appl. No.: 16/935,040

(22) Filed: Jul. 21, 2020

(65) Prior Publication Data
US 2021/0200949 A1     Jul. 1, 2021

(30) Foreign Application Priority Data
Dec. 30, 2019   (CN) .......................... 201911399965.1

(51) Int. Cl.
G06F 40/00       (2020.01)
G06F 40/242      (2020.01)
G06F 40/279      (2020.01)

(52) U.S. Cl.
CPC .......... *G06F 40/242* (2020.01); *G06F 40/279* (2020.01)

(58) Field of Classification Search
CPC ...... G06F 40/242; G06F 40/279; G06F 40/30; G06F 17/18; G06F 16/3347; G06N 3/08; G06K 9/6256
See application file for complete search history.

(56) References Cited

U.S. PATENT DOCUMENTS

2015/0066814 A1    3/2015  Allen et al.
2015/0227528 A1*   8/2015  Kang ................. G06F 16/24578
                                                       707/750

FOREIGN PATENT DOCUMENTS

CN       105354183 A        2/2016
CN       106649519 A   *    5/2017  ........... G06F 16/335
(Continued)

OTHER PUBLICATIONS

Ke et al. (SentiLR: Sentiment-aware language representation learning with linguistic knowledge, P Ke, H Ji, S Liu, X Zhu, M Huang—arXiv preprint arXiv :1911.02493, 2019) (Year: 2019).*

(Continued)

*Primary Examiner* — Huyen X Vo
*Assistant Examiner* — Philip H Lam
(74) *Attorney, Agent, or Firm* — Lathrop GPM LLP (57) ABSTRACT

The present disclosure provides a pre-training method for a sentiment analysis model and an electronic device, which relates to a field of artificial intelligence technologies. The method includes: based on a given seed sentiment dictionary, performing sentimental knowledge detection on a training corpus in a training corpus set, and determining a detection sentiment word and a detection word pair of the training corpus; according to preset mask processing rules, performing mask process on the training corpus to generate a masked corpus; performing encoding and decoding on the masked corpus by using a preset encoder and decoder to determine the detection sentiment word and the detection word pair of the training corpus; and updating the preset encoder and decoder according to a difference between prediction sentiment word and the detection sentiment word, and a difference between prediction word pair and the detection word pair.

18 Claims, 3 Drawing Sheets

(56) References Cited

FOREIGN PATENT DOCUMENTS

| CN | 107133282 | A | | 9/2017 | | |
|---|---|---|---|---|---|---|
| CN | 109189919 | A | | 1/2019 | | |
| CN | 109800418 | A | | 5/2019 | | |
| CN | 110083702 | A | | 8/2019 | | |
| CN | 110209824 | A | | 9/2019 | | |
| CN | 110309407 | A | | 10/2019 | | |
| CN | 110377740 | A | * | 10/2019 | ........... | G06F 16/353 |
| CN | 110377740 | A | | 10/2019 | | |
| CN | 110413780 | A | | 11/2019 | | |
| CN | 110489553 | A | * | 11/2019 | | |
| CN | 110543561 | A | | 12/2019 | | |
| CN | 107273348 | B | * | 12/2020 | ........... | G06F 40/289 |
| WO | WO 2018213763 | A1 | | 11/2018 | | |
| WO | WO-2021098652 | A1 | * | 5/2021 | ........... | G06K 9/6256 |

OTHER PUBLICATIONS

European Patent Application No. 20185932.9 extended Search and Opinion dated Dec. 23, 2020, 10 pages.
Chinese Patent Application No. 201911399965.1 Second Office Action dated Nov. 17, 2020, 5 pages.
Chinese Patent Application No. 201911399965.1 English translation of Second Office Action dated Nov. 17, 2020, 9 pages.
Araci, D. "FinBERT: Financial Sentiment Analysis with Pre-trained Language", Aug. 27, 2019, 12 pages.
Cui, Y., et al. "Pre-Training with Whole Word Masking for Chinese BERT" Jun. 19, 2019, 10 pages.
Liu, Y. et al. "RoBERTa :A Robustly Optimized BERT Pretraining Approach", Jul. 26, 2019,13 pages.
Ke, P et al., "SentiLR :Linguistic Knowledge Enhanced Language Representation for Sentiment Analysis" Nov. 6, 2019, 11 pages.
Tian, H. et al. "SKEP :Sentiment Knowledge Enhanced Pre-training for Sentiment Analysis", May 20, 2020, 10 pages.
Chinese Patent Application No. 201911399965.1 First Office Action dated Aug. 19, 2020, 11 pages.
Chinese Patent Application No. 201911399965.1 English translation of First Office Action dated Aug. 19, 2020, 11 pages.
Japanese Patent Application No. 2020-121922 Office Action dated Oct. 5, 2021, 3 pages.
Japanese Patent Application No. 2020-121922 English translation of Office Action dated Oct. 5, 2021, 4 pages.

* cited by examiner

PRE-TRAINING METHOD FOR SENTIMENT ANALYSIS MODEL, AND ELECTRONIC DEVICE

CROSS REFERENCE TO RELATED APPLICATION

This application is based on and claims priority to Chinese Patent Application No. 201911399965.1 filed Dec. 30, 2019, the entire content of which is hereby incorporated by reference in its entirety.

TECHNICAL FIELD

The present disclosure relates to a field of computer technologies, and more particularly, to artificial intelligence technologies, and provides a pre-training method for a sentiment analysis model and an electronic device.

BACKGROUND

Sentiment analysis refers to researching people's views, attitudes, and evaluations on entities such as products, services, and organizations. Usually, sentiment analysis includes multiple subtasks, such as sentiment tendentiousness analysis, comment opinion mining, entity-level sentiment analysis, and emotion analysis. Currently, sentiment analysis of text can be achieved through sentiment analysis models.

In the related art, a deep neural network is used to perform self-supervised learning on large-scale unsupervised data to generate a pre-training model, and then in a specific sentiment analysis task, based on sentiment annotation data of this type of task, transfer learning is performed on the pre-training model to generate a sentiment analysis model for this type of task.

However, since the pre-training model pays more attention to versatility of downstream tasks, it lacks an ability to model specific directional tasks, which leads to a poor effect of sentiment analysis on the text through the sentiment analysis model generated by transfer learning of the pre-training model.

SUMMARY

Embodiments of the present disclosure provide a pre-training method for a sentiment analysis model, a pre-training apparatus for a sentiment analysis model and an electronic device, for the purpose of solving a problem in the related art that a pre-training model lacks an ability to model specific directional tasks since it pays more attention to versatility of downstream tasks, which leads to a poor effect of sentiment analysis on text through the sentiment analysis model generated by transfer learning of the pre-training model.

Embodiments of a first aspect of the present disclosure provide a pre-training method for a sentiment analysis model, the method includes: based on a given seed sentiment dictionary, performing sentimental knowledge detection on each training corpus in a training corpus set to determine a detection sentiment word and a detection word pair contained in the training corpus, in which each detection word pair contains a comment point and a sentiment word; according to a preset mask processing rule, performing mask process on the detection sentiment word and the detection word pair in each training corpus to generate a masked corpus of the training corpus; performing encoding process on the masked corpus by using a preset encoder to generate feature vectors corresponding to the training corpus; performing decoding process on the feature vectors by using a preset decoder to determine a prediction sentiment word and a prediction word pair contained in the training corpus; and updating the preset encoder and the preset decoder according to a difference between the prediction sentiment word and the detection sentiment word, and a difference between the prediction word pair and the detection word pair.

Embodiments of a second aspect of the present disclosure provide a pre-training apparatus for a sentiment analysis model, the apparatus includes: a first determining module, configured to, based on a given seed sentiment dictionary, perform sentimental knowledge detection on each training corpus in a training corpus set to determine a detection sentiment word and a detection word pair contained in the training corpus, in which each detection word pair contains a comment point and a sentiment word; a first generating module, configured to, according to a preset mask processing rule, perform mask process on the detection sentiment word and the detection word pair in each training corpus to generate a masked corpus of the training corpus; a second generating module, configured to, perform encoding process on the masked corpus by using a preset encoder to generate feature vectors corresponding to the training corpus; a second determining module, configured to perform decoding process on the feature vectors by using a preset decoder to determine a prediction sentiment word and a prediction word pair contained in the training corpus; and an updating module, configured to update the preset encoder and the preset decoder according to a difference between the prediction sentiment word and the detection sentiment word, and a difference between the prediction word pair and the detection word pair.

Embodiments of a third aspect of the present disclosure provide an electronic device, and the electronic device includes: at least one processor, and a memory communicatively connected to the at least one processor, in which the memory stores instructions executable by the at least one processor, the instructions are executed by the at least one processor to enable the at least one processor to implement the pre-training method for a sentiment analysis model.

Embodiments of a fourth aspect of the present disclosure provide a non-transitory computer-readable storage medium storing computer instructions, in which the computer instructions are configured to cause a computer to implement the pre-training method for a sentiment analysis model.

The technical solution provided by the embodiments of the present disclosure may include the following beneficial effects. Through integration of statistically calculated sentimental knowledge in a pre-training process of a model, the pre-training model may better express data of a sentiment analysis direction, thus improving an effect of sentiment analysis. Based on the method, sentimental knowledge detection is performed on each training corpus in a training corpus set based on a given seed sentiment dictionary to determine a detection sentiment word and a detection word pair contained in the training corpus. According to a preset mask processing rule, mask process is performed on the detection sentiment word and the detection word pair in each training corpus to generate a masked corpus of the training corpus. Then, encoding process is performed on the masked corpus by using a preset encoder to generate feature vectors corresponding to the training corpus, and decoding process is performed on the feature vectors by using a preset decoder to determine a prediction sentiment word and a prediction word pair contained in the training corpus. The preset encoder and the preset decoder are updated according to a difference between the prediction sentiment word and the detection sentiment word, and a difference between the prediction word pair and the detection word pair. Therefore, the problem in the related art that the pre-training model lacks the ability to model specific directional tasks since it pays more attention to versatility of downstream tasks, which leads to the poor effect of sentiment analysis on the text through the sentiment analysis model generated by transfer learning of the pre-training model, is overcome. Further, the integration of statistically calculated sentimental knowledge in the pre-training process of the model is achieved, such that the pre-training model may better express the data of the sentiment analysis direction, thus improving the technical effect of sentiment analysis.

Additional effects possessed by the above optional methods are described below in combination with specific embodiments.

BRIEF DESCRIPTION OF THE DRAWINGS

The drawings are for better understanding of this solution, and do not constitute a limitation of the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Embodiments of the present disclosure provide a pre-training method for a sentiment analysis model, for the purpose of solving a problem in the related art that a pre-training model lacks an ability to model specific directional tasks since it pays more attention to versatility of downstream tasks, which leads to a poor effect of sentiment analysis on text through the sentiment analysis model generated by transfer learning of the pre-training model.

A pre-training method for a sentiment analysis model, a pre-training apparatus for a sentiment analysis model and an electronic device are described below with reference to the drawings.

Figure 1:
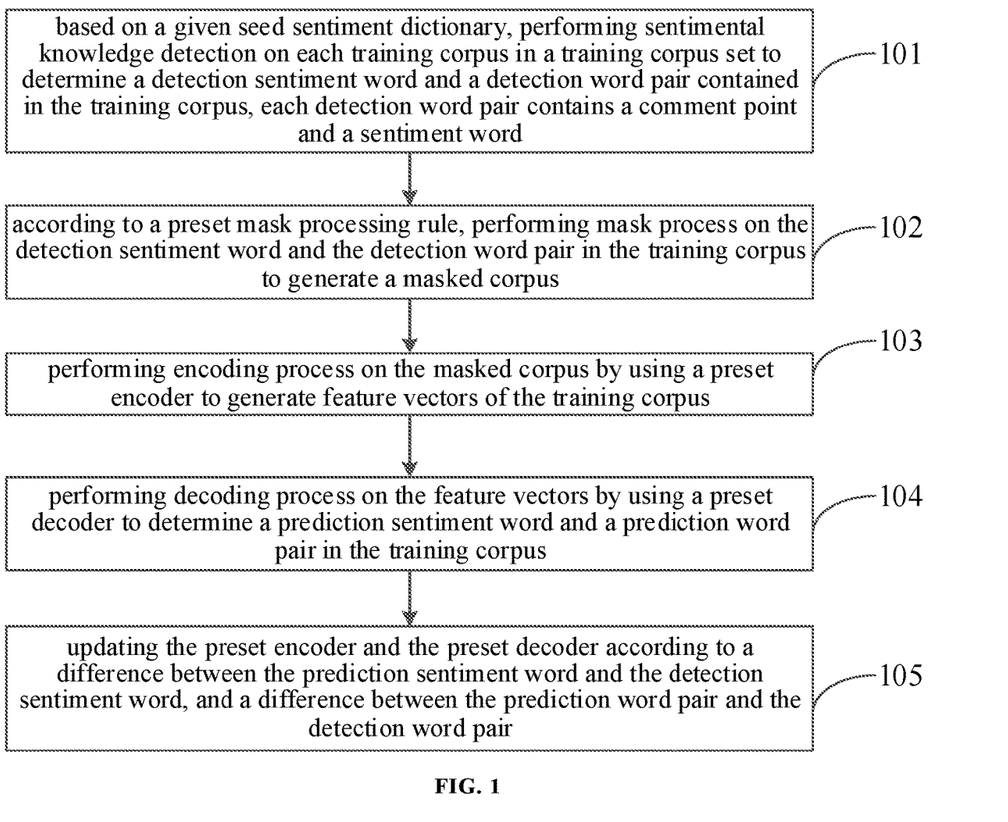
FIG. 1 is a flowchart of a pre-training method for a sentiment analysis model according to embodiments of the present disclosure.

As illustrated in FIG. 1, a detailed description of the pre-training method for a sentiment analysis model is described according to the embodiments of the present application.

FIG. 1 is a flowchart of a pre-training method for a sentiment analysis model according to embodiments of the present disclosure.

As illustrated in FIG. 1, the pre-training method for a sentiment analysis model includes the following steps.

At step 101, based on a given seed sentiment dictionary, sentimental knowledge detection is performed on each training corpus in a training corpus set to determine a detection sentiment word and a detection word pair contained in the training corpus, in which each detection word pair contains a comment point and a sentiment word.

The given seed sentiment dictionary includes various sentiment words. It is noted that the given seed sentiment dictionary may include a few sentiment words that express common sentiments, and the seed sentiment dictionary may be supplemented in actual use; or, the given seed sentiment dictionary may be generated by expanding synonyms and antonyms of a few sentiment words, and may be supplemented in actual use based on newly acquired sentiment words and synonyms and antonyms of the newly acquired sentiment words.

The detection sentiment word refers to a sentiment word included in the training corpus determined by performing sentimental knowledge detection on the training corpus. The detection word pair refers to a sentiment word included in the training corpus and a comment point corresponding to the sentiment word in the training corpus determined by performing sentimental knowledge detection on the training corpus.

For example, if the training corpus is "this product came really fast and I appreciated it", then the sentimental knowledge detection is performed on the training corpus to determine that the detection sentiment words contained in the training corpus are "fast" and "appreciated". Since the training corpus is a comment on "this product", it may be determined that the comment point corresponding to the detection sentiment word "fast" is "product", so that it may be determined that the detection word pair included in the training corpus is "product fast".

In the embodiments of the present disclosure, based on a co-occurrence frequency or a similarity of each word segmentation in the training corpus and each sentiment word in the given seed sentiment dictionary, the training corpus may be subjected to the sentimental knowledge detection to determine sentiment words included in the training corpus. That is, in a possible implementation of the embodiment of the present disclosure, the above step 101 may include:

when a co-occurrence frequency of a j-th word segmentation of an i-th training corpus and a first seed sentiment word from the given seed sentiment dictionary in the training corpus set is greater than a first threshold, determining the j-th word segmentation to be a detection sentiment word in the i-th training corpus;

or, when a similarity between a j-th word segmentation of an i-th training corpus and a second seed sentiment word from the given seed sentiment dictionary is greater than a second threshold, determining the j-th word segmentation to be the detection sentiment word in the i-th training corpus;

in which i is an integer greater than 0 and less than or equal to N, j is a positive integer greater than 0 and less than or equal to K, N is a number of training corpus contained in the training corpus set, and K is a number of word segmentations contained in the j-th training corpus.

The first seed sentiment word and the second seed sentiment word may be any seed sentiment word in the given seed sentiment dictionary.

The co-occurrence frequency is used to measure a correlation between two words. In detail, the higher the co-occurrence frequency of the two words, the higher the correlation between the two words; otherwise, the lower the co-occurrence frequency of the two words, the lower the correlation between the two words.

As a possible implementation, when performing the sentimental knowledge detection on the i-th training corpus in the training corpus set, the i-th training corpus may be first subjected to word segmentation processing to determine K word segmentations included in the i-th training corpus, and co-occurrence frequencies of the K word segmentations and each seed sentiment word in the given seed sentiment dictionary are calculated respectively. If it is determined that the co-occurrence frequency of the j-th word segmentation in the i-th training corpus and the first seed sentiment word in the given seed sentiment dictionary is greater than the first threshold, it can be determined that the j-th word segmentation in the i-th training corpus is highly related to the first seed sentiment word, so that the j-th word segmentation in the i-th training corpus is determined as the detection sentiment word in the i-th training corpus.

Alternatively, Semantic Orientation Pointwise Mutual Information (SO-PMI) algorithm is adopted to determine the co-occurrence frequency of each word segmentation in the training corpus and each seed sentiment word in the given seed sentiment dictionary, to determine the detection sentiment words contained in the training corpus. In detail, if a SO-PMI value of the j-th word segmentation in the i-th training corpus and the first seed sentiment word in the given seed sentiment dictionary is greater than the first threshold, it may be determined that the co-occurrence frequency of the j-th word segmentation and the first the seed sentiment word is greater than the first threshold, so that the j-th word segmentation in the i-th training corpus is determined as the detection sentiment word in the i-th training corpus.

It is noted that, in actual use, a method for determining the co-occurrence frequency and the specific value of the first threshold may be preset according to actual requirements, which are not limited in the embodiments of the present disclosure. For example, when the SO-PMI algorithm is used to determine the detection sentiment words in the training corpus, the first threshold may be 0.

As a possible implementation, the sentiment words included in the training corpus may also be determined according to the similarity between each word segmentation in the training corpus and each seed sentiment word in the given seed sentiment dictionary. In detail, when performing the sentimental knowledge detection on the i-th training corpus, the word segmentation processing may be performed on the i-th training corpus to determine each word segmentation included in the i-th training corpus, and then word vectors corresponding respectively to word segmentations in the i-th training corpus and word vectors corresponding respectively to seed sentiment words in the given seed sentiment dictionary are determined to determine the similarity between the word vector corresponding to each word segmentation in the i-th training corpus and the word vector corresponding to each seed sentiment word. If it is determined that the similarity between the word vector corresponding to the j-th word segmentation in the i-th training corpus and the word vector corresponding to the second seed sentiment word in the given seed sentiment dictionary is greater than the second threshold, it may be determined that the similarity between the j-th word segmentation and the second seed sentiment word is greater than the second threshold, that is, the j-th word segmentation has a high similarity with the second seed sentiment word, so that the j-th word segmentation in the i-th training corpus is determined as the detection sentiment word in the i-th training corpus.

It is noted that in actual use, a method of determining the similarity between the word segmentation in the training corpus and the seed sentiment word in the given seed sentiment dictionary, and the specific value of the second threshold may be preset according to actual requirements, which are not limited in the embodiments of the present disclosure. For example, the similarity between the word segmentation and the sentiment word may be a cosine similarity, and the second threshold may be 0.8.

Further, in the process of using the given seed sentiment dictionary, the given seed sentiment dictionary may be supplemented according to the sentiment words in the determined training corpus. That is, in a possible implementation of the embodiment of the present disclosure, after determining that the j-th word segmentation is the detection sentiment word in the i-th training corpus, the method may further include: adding the j-th word segmentation into the given seed sentiment dictionary.

In the embodiments of the present disclosure, when using the given seed sentiment dictionary to determine the detection sentiment words included in each training corpus in the training corpus set, the detection sentiment words included in the determined training corpus may be added to the given seed sentiment dictionary to update the given seed sentiment dictionary. Therefore, every time a detection sentiment word included in the training corpus is determined, the determined detection sentiment word is added to the given seed sentiment dictionary, in order to make the sentiment words included in the given seed sentiment dictionary more abundant during the model training process, further make a reliability of determining sentiment words included in the training corpus higher during subsequent process. Therefore, after determining the j-th word segmentation as the detection sentiment word of the i-th training corpus, the j-th word segmentation is added to the given seed sentiment dictionary.

Further, after the detection sentiment words included in the training corpus are determined, according to the determined detection sentiment words, comment points matching with the detection sentiment words may be determined to determine the detection word pairs included in the training corpus. That is, in a possible implementation of the embodiment of the present disclosure, after determining the j-th word segmentation to be the detection sentiment word in the i-th training corpus, the method further includes: based on a matching degree of a positional relation between each word segmentation in the i-th training corpus and the j-th word segmentation in the i-th training corpus with a preset part-of-speech template or a preset syntactic template, determining the detection word pair contained in the i-th training corpus.

The preset part-of-speech template may restrict the part-of-speech of the comment point and the sentiment word included in the detection word pair, and the part-of-speech of the word segments adjacent to the sentiment word and the comment point. For example, in the preset part-of-speech template, the part-of-speech of the comment point can be specified as noun, the part-of-speech of the sentiment word as adjective or verb.

The preset syntax template may restrict a distance and a grammatical relation between the comment point and the sentiment word included in the detection word pair. For example, the preset syntax template can specify that the word segment corresponding to the comment point is the third word segment before the sentiment word.

It is noted that, in actual use, the preset part-of-speech template or the preset syntax template may be determined according to actual needs or experiences, which are not limited in the embodiments of the present disclosure.

In the embodiments of the present disclosure, after determining that the j-th word segmentation in the i-th training corpus as the detection sentiment word of the i-th training corpus, according to the positional relation between each word segmentation in the i-th training corpus and the j-th word segmentation in the i-th training corpus, it is determined whether the positional relation between each word segmentation and the j-th word segmentation matches the preset part-of-speech template or the preset syntax template.

In detail, a third threshold may be determined in advance. If it is determined that the matching degree of the positional relation between the first word segmentation and the j-th word segmentation with the preset part-of-speech template or the preset syntactic template is greater than the third threshold, it is determined that the positional relation between the first word segmentation and the j-th word segmentation matches the preset part-of-speech template or the preset syntactic template, so that the first word segmentation is determined as the comment point corresponding to the j-th word segmentation, and the word pair composed of the first word segmentation and the j-th word segmentation is determined as a detection word pair included in the i-th training corpus.

For example, the preset part-of-speech template is "the part-of-speech of the comment point is noun, and the part-of-speech of the sentiment word is adjective", the preset syntax template is "the comment point is the third word segmentation before the sentiment word", and the training corpus is "this product came really fast and I appreciated it", the determined detection sentiment words are "fast", and "appreciated", so that the part-of-speech of the word segmentation "product" matches the preset part-of-speech template, and the positional relation between the word segmentation "product" and the detection sentiment word "fast" matches the preset syntactic template, so that "product fast" is determined as a detection word pair in the training corpus; and since there is no word segmentation in the training corpus that has the part-of-speech matching the preset part-of-speech template and has the positional relation with the detection sentiment word "appreciated" matching the preset syntactic template, it is determined that there is no comment point corresponding to the detected sentiment word "appreciated", so that the detection word pair included in the training corpus is determined as "product fast".

A step 102, according to a preset mask processing rule, mask process is performed on the detection sentiment word and the detection word pair in the training corpus to generate a masked corpus.

In the embodiments of the present disclosure, in order to focus on the sentimental knowledge in the training corpus and improve an expression ability of the trained sentiment analysis model for the sentimental knowledge during the training process, according to the preset mask processing rule, the mask process is performed on the detection sentiment word and the detection word pair in each training corpus to generate the masked corpus. Therefore, when the masked corpus is input to the training model, a representation of the masked detection sentiment word and detection word pair by the model may be enhanced, thereby improving the effect of sentiment analysis.

Figure 2:
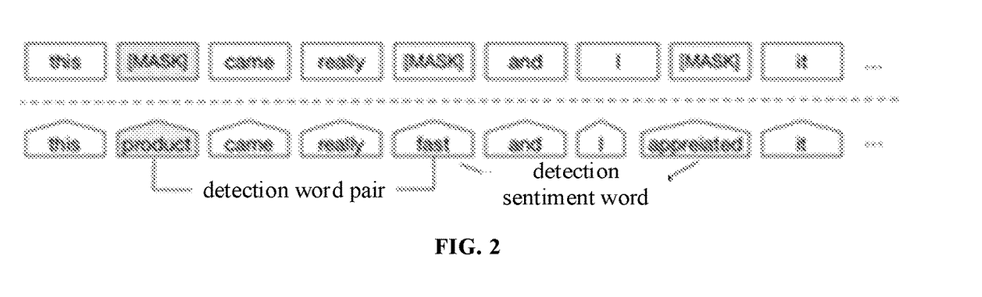
FIG. 2 is a schematic diagram of mask processing on training corpus according to embodiments of the present disclosure.

For example, the training corpus is "this product came really fast and I appreciated it", the determined detection sentiment words are "fast", and "appreciated", and the determined detection word pair is "product fast". FIG. 2 is a schematic diagram of mask processing on training corpus according to embodiments of the present disclosure, in which [MASK] is the word segmentation for masking processing.

Further, if there are too many masked words in the training corpus, it is prone to make the model not correctly understand overall semantics of the masked corpus. Therefore, only a part of the detection sentiment words and the detection word pairs are masked. That is, in a possible implementation of the embodiments of the present disclosure, the above step 102 may include: according to a preset ratio, performing the mask process on the detection sentiment word and the detection word pair in the training corpus.

As a possible implementation, the training corpus may include a plurality of detection sentiment words or a plurality of detection word pairs, resulting in an excessive number of detection sentiment words and detection word pairs in the training corpus. If performing the mask process on all the detection sentiment words and the detection word pairs, it is difficult for the model to correctly understand the overall semantics of the masked corpus, which affects a final model training effect. Therefore, in the embodiments of the present disclosure, the ratio of a number of word segmentations to be masked to a total number of word segmentations included in the detection sentiment words and detection word pairs in the training corpus can be set in advance, and then according to the preset ratio, the mask process is performed on portion of word segmentations in the detection sentiment words and the detection word pairs in the training corpus, in order to improve concern on the sentimental knowledge, without affecting understanding of the overall semantic of the masked corpus.

It is noted that during the model training process, each training corpus can be trained multiple times, so that each time one training corpus is used, different detection sentiment words and different detection word pairs in the training corpus are subjected to the mask process, so as to enable the model to learn the sentimental knowledge in each training corpus.

At step 103, encoding process is performed on the masked corpus by using a preset encoder to generate feature vectors of the training corpus.

In the embodiments of the present disclosure, after performing the mask process on the training corpus, the encoding process is performed on the masked corpus by using the preset encoder to generate the feature vectors of the training corpus.

As a possible implementation, the preset encoder may be a deep bidirectional neural network, which has a strong expression ability for text. Therefore, the feature vectors generated by performing the encoding process on the masked corpus using the deep bidirectional neural network not only can better represent the sentimental knowledge contained in the training corpus, but also can better represent the overall semantics of the training corpus.

At step 104, decoding process is performed on the feature vectors by using a preset decoder to determine a prediction sentiment word and a prediction word pair in the training corpus.

The preset encoder and the preset decoder may constitute the sentiment analysis model of the embodiments of the present disclosure, that is, the preset encoder and the preset decoder may be respectively a part of the sentiment analysis model of the embodiments of the present disclosure.

The prediction sentiment word refers to a sentiment word contained in the training corpus determined by using the sentiment analysis model of the embodiments of the present disclosure. The prediction word pair refers to a word pair contained in the training corpus determined by using the sentiment analysis model of the embodiments of the present embodiment.

In the embodiments of the present disclosure, after determining the feature vectors corresponding to each training corpus, the preset decoder corresponding to the preset encoder may be used to perform the decoding process on the feature vectors corresponding to each training corpus to determine the prediction sentiment word and the prediction word pair contained in the training corpus.

At step 105, the preset encoder and the preset decoder are updated according to a difference between the prediction sentiment word and the detection sentiment word, and a difference between the prediction word pair and the detection word pair.

In the embodiments of the present disclosure, the detection sentiment word and the detection word pair in the training corpus may represent the sentimental knowledge actually existing in the training corpus, so that the difference between the prediction sentiment word and the detection sentiment word in each training corpus and the difference between the prediction word pair and the detection word pair in each training corpus may reflect an accuracy of sentiment analysis on the text by the preset encoder and the preset decoder. Therefore, the preset encoder and the preset decoder are updated according to the difference between the prediction sentiment word and the detection sentiment word and the difference between the prediction word pair and the detection word pair in each training corpus.

As a possible implementation, a first target function corresponding to the sentiment word and a second target function corresponding to the word pair are designed respectively, so that the value of the first target function can be used to measure the difference between the prediction sentiment word and the detection sentiment word in the training corpus set, and the value of the second target function can be used to measure the difference between the prediction word pair and the detection word pair in the training corpus set.

In detail, the smaller the value of the first target function, the smaller the difference between the prediction sentiment word and the detection sentiment word in the training corpus set, that is, the higher the accuracy of the sentiment analysis on the text by the preset encoder and the preset decoder; otherwise, the larger the value of the first target function, the greater the difference between the prediction sentiment word and the detection sentiment word in the training corpus set, that is, the lower the accuracy of the sentiment analysis on the text by the preset encoder and the preset decoder. Correspondingly, the smaller the value of the second target function, the smaller the difference between the prediction word pair and the detection word pair in the training corpus set, that is, the higher the accuracy of the sentiment analysis on the text by the preset encoder and the preset decoder; otherwise, the larger the value of the second target function, the greater the difference between the prediction word pair and the detection word pair in the training corpus set, that is, the lower the accuracy of the sentiment analysis on the text by the preset encoder and the preset decoder. Therefore, a fourth threshold corresponding to the first target function and a fifth threshold corresponding to the second target function are set in advance, if the value of the first target function is greater than the fourth threshold or the value of the second target function is greater than the fifth threshold, it is determined that the performance of the preset encoder and the preset decoder does not meet a performance requirement of the sentiment analysis, so that parameters of the preset encoder and the preset decoder may be updated, and then the training corpus set, the updated preset decoder and the updated preset encoder are reused to train until the value of the first target function is less than or equal to the fourth threshold and the value of the second target function is less than or equal to the fifth threshold, then the pre-training process for the sentiment analysis model is completed. If the value of the first target function is less than or equal to the fourth threshold, and the value of the second target function is less than or equal to the fifth threshold, it is determined that the performance of the preset encoder and preset decoder meets the performance requirement of the sentiment analysis, so that the parameters of the preset encoder and the preset decoder need not to be updated, and the pre-training process of the sentiment analysis model is completed.

According to the technical solution of the embodiments of the present disclosure, sentimental knowledge detection is performed on each training corpus in a training corpus set based on a given seed sentiment dictionary to determine a detection sentiment word and a detection word pair contained in the training corpus. According to a preset mask processing rule, mask process is performed on the detection sentiment word and the detection word pair in the training corpus to generate a masked corpus. Then, encoding process is performed on the masked corpus by using a preset encoder to generate feature vectors corresponding to the training corpus, and decoding process is performed on the feature vectors by using a preset decoder to determine a prediction sentiment word and a prediction word pair contained in the training corpus. The preset encoder and decoder are updated according to a difference between the prediction sentiment word and the detection sentiment word, and a difference between the prediction word pair and the detection word pair. Therefore, through integration of statistically calculated sentimental knowledge in a pre-training process of a model, the pre-training model may better express data of a sentiment analysis direction, thus improving a technical effect of sentiment analysis.

In a possible implementation of the present disclosure, the sentimental knowledge of the training corpus may further include polarity information of sentiment words to further improve the sentiment analysis effect of the pre-training model for the sentiment analysis.

The pre-training method of the sentiment analysis model according to the embodiments of the present disclosure is further described below with reference to FIG. 3.

Figure 3:
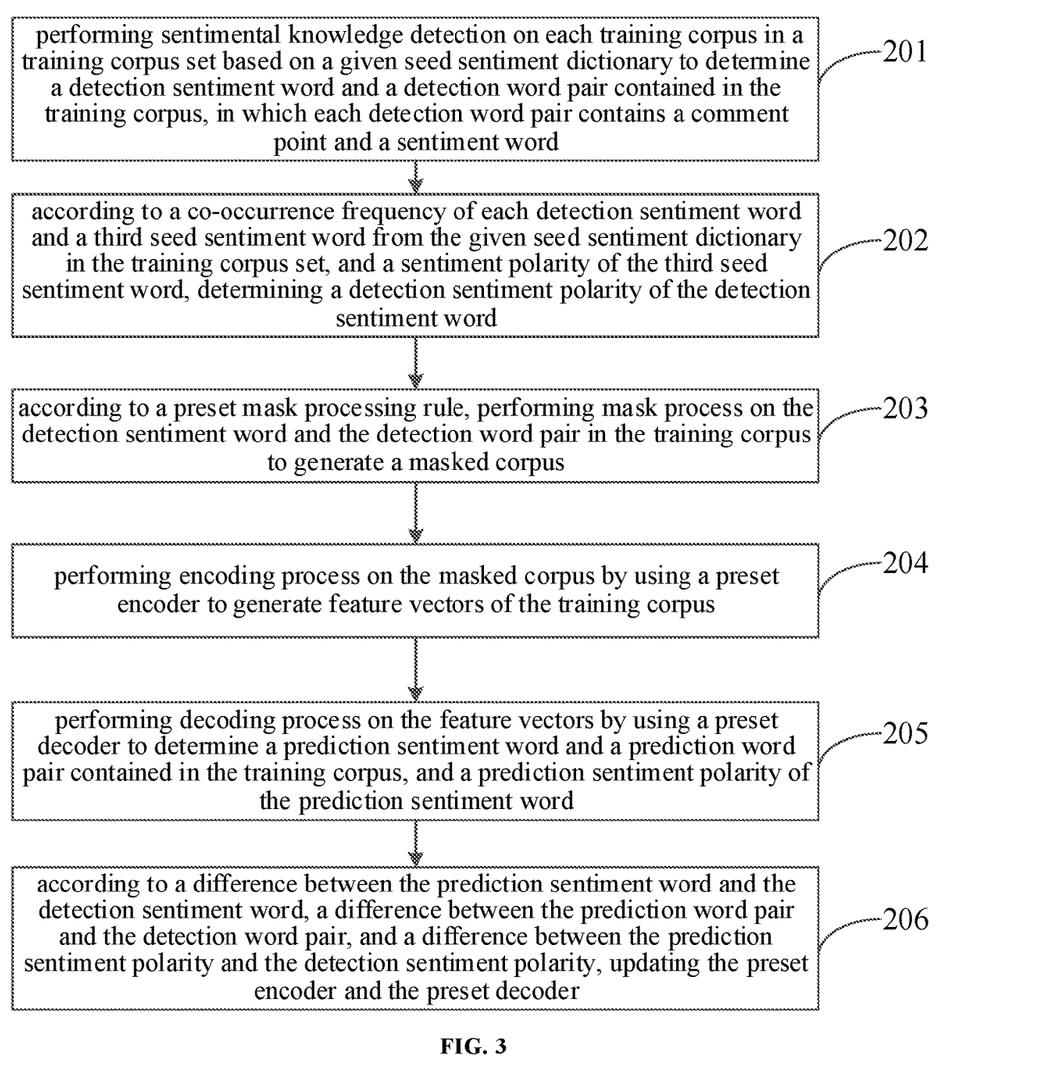
FIG. 3 is a flowchart of another pre-training method for a sentiment analysis model according to embodiments of the present disclosure.

FIG. 3 is a flowchart of another pre-training method for a sentiment analysis model according to embodiments of the present disclosure.

As illustrated in FIG. 3, the pre-training method for a sentiment analysis model includes the following steps.

At step 201, sentimental knowledge detection is performed on each training corpus in a training corpus set based on a given seed sentiment dictionary to determine a detection sentiment word and a detection word pair contained in the training corpus, in which each detection word pair contains a comment point and a sentiment word.

For the specific implementation process and principle of the above step 201, reference may be made to the detailed description of the above embodiment, which is not repeated here.

At step 202, according to a co-occurrence frequency of each detection sentiment word and a third seed sentiment word from the given seed sentiment dictionary in the training corpus set, and a sentiment polarity of the third seed sentiment word, a detection sentiment polarity of the detection sentiment word is determined.

In the embodiments of the present disclosure, after determining the detection sentiment word contained in the training corpus, the detection sentiment polarity of each detection sentiment word may be determined, so as to enrich the sentimental knowledge obtained by performing statistic on the training corpus set and further improve the expression ability of the sentimental knowledge by a pre-training model for sentiment analysis.

As a possible implementation, the given seed sentiment dictionary may further include the sentiment polarity of each seed sentiment word, so that after determining the detection sentiment word contained in the training corpus, the detection sentiment polarity of the detection sentiment word is determined according to the given seed sentiment dictionary.

Alternatively, since the detection sentiment words in the training corpus may be determined according to the co-occurrence frequency of each word segmentation from the training corpus and each seed sentiment word from the given seed sentiment dictionary, it is known from the above embodiment that when the co-occurrence frequency of a word segmentation from the training corpus and a first seed sentiment word in the training corpus set is greater than a first threshold, the word segmentation may be determined as the detection sentiment word in the training corpus. Therefore, in a possible implementation of the embodiment of the present disclosure, a sentiment polarity of the first seed sentiment word whose co-occurrence frequency with the detection sentiment word is greater than the first threshold may be directly determined as the detection sentiment polarity of the detection sentiment word.

Alternatively, after the detection sentiment word included in the training corpus is determined, a sentiment polarity of a third seed sentiment word whose co-occurrence frequency with the detection sentiment word is greater than a sixth threshold may be determined as the detection sentiment polarity of the detection sentiment word.

It is noted that in actual use, the sixth threshold may be the same as or different from the first threshold, and a value of the sixth threshold may be determined according to actual needs and specific application scenarios, which is not limited in the embodiments.

At step 203, according to a preset mask processing rule, mask process is performed on the detection sentiment word and the detection word pair in the training corpus to generate a masked corpus.

At step 204, encoding process is performed on the masked corpus by using a preset encoder to generate feature vectors of the training corpus.

For the specific implementation process and principles of the above steps 203-204, reference may be made to the detailed description of the above embodiments, which are not repeated herein.

At step 205, decoding process is performed on the feature vectors by using a preset decoder to determine a prediction sentiment word and a prediction word pair contained in the training corpus, and a prediction sentiment polarity of the prediction sentiment word.

In the embodiments of the present disclosure, the preset decoder is used to perform the decoding process on the feature vectors of each training corpus to determine the prediction sentiment word and the prediction word pair included in the training corpus, meanwhile determining the prediction sentiment polarity of the prediction sentiment word.

At step 206, according to a difference between the prediction sentiment word and the detection sentiment word, a difference between the prediction word pair and the detection word pair, and a difference between the prediction sentiment polarity and the detection sentiment polarity, the preset encoder and the preset decoder are updated.

In the embodiments of the present disclosure, the detection sentiment words, the detection sentiment words in the training corpus, and the detection sentiment polarity of each detection sentiment word may represent the sentimental knowledge that actually exists in the training corpus, so that the difference between the prediction sentiment word and the detection sentiment word in each training corpus, the difference between the prediction word pair and the detection word pair in each training corpus, and the difference between the prediction sentiment polarity of each prediction sentiment word and the detection sentiment polarity of each detection sentiment word may reflect the accuracy of the sentiment analysis performed by the preset encoder and the preset decoder on the text. Therefore, according to the difference between the prediction sentiment word and the detection sentiment word in each training corpus, the difference between the prediction word pair and the detection word pair in each training corpus, and the difference between the prediction sentiment polarity of each prediction sentiment word and the detection sentiment polarity, the preset encoder and the preset decoder may be updated.

As a possible implementation, a first target function corresponding to the sentiment words, a second target function corresponding to the word pairs, and a third target function corresponding to the sentiment polarities can be designed respectively, so that the difference between the prediction sentiment word and the detection sentiment word in the training corpus set can be measured based on a value of the first target function, the difference between the prediction word pair and the detection word pair in the training corpus set may be measured based on a value of the second target function, and the difference between the prediction sentiment polarity of each prediction sentiment word in the training corpus set and the detection sentiment polarity of each detection sentiment word in the training corpus set may be measured based on a value of the third target function.

In detail, the smaller the value of the first target function, the smaller the difference between the prediction sentiment word and the detection sentiment word in the training corpus set, that is, the higher the accuracy of the sentiment analysis on the text by the preset encoder and the preset decoder; otherwise, the larger the value of the first target function, the greater the difference between the prediction sentiment word and the detection sentiment word in the training corpus set, that is, the lower the accuracy of the sentiment analysis on the text by the preset encoder and the preset decoder. Correspondingly, the smaller the value of the second target function, the smaller the difference between the prediction word pair and the detection word pair in the training corpus set, that is, the higher the accuracy of the sentiment analysis on the text by the preset encoder and the preset decoder; otherwise, the larger the value of the second target function, the greater the difference between the prediction word pair and the detection word pair in the training corpus set, that is, the lower the accuracy of the sentiment analysis on the text by the preset encoder and the preset decoder. Correspondingly, the smaller the value of the third target function, the smaller the difference between the prediction sentiment polarity of the prediction sentiment word in the training corpus set and the detection sentiment polarity of the detection sentiment word in the training corpus set, that is, the higher the accuracy of the sentiment analysis on the text by the preset encoder and the preset decoder; otherwise, the larger the value of the third target function, the greater the difference between the prediction sentiment polarity of the prediction sentiment word in the training corpus set and the detection sentiment polarity of the detection sentiment word in the training corpus set, that is, the lower the accuracy of the sentiment analysis on the text by the preset encoder and the preset decoder.

Therefore, a fourth threshold corresponding to the first target function, a fifth threshold corresponding to the second target function, and a seventh threshold corresponding to the third target function may be set in advance. If the value of any one of the first target function, the second target function, and the third target function is greater than the respective threshold, it may be determined that the performance of the preset encoder and the preset decoder does not meet a performance requirement of sentiment analysis, so that parameters of the preset encoder and the preset decoder are updated, and then the training corpus, the updated preset decoder and the updated preset encoder are reused for training until the value of the first target function is less than or equal to the fourth threshold, the value of the second target function is less than or equal to the fifth threshold, and the value of the third target function is less than or equal to the seventh threshold, then the pre-training process for the sentiment analysis model is completed. If the value of the first target function is less than or equal to the fourth threshold, the value of the second target function is less than or equal to the fifth threshold, and the value of the third target function is less than or equal to the seventh threshold, it may be determined that the performance of the preset encoder and the preset decoder meets the performance requirement of sentiment analysis, so that the parameters of the preset encoder and the preset decoder need not to be updated, and the pre-training process of the sentiment analysis model is completed.

According to the technical solution of the embodiments of the present disclosure, sentimental knowledge detection is performed on each training corpus in a training corpus set based on a given seed sentiment dictionary to determine a detection sentiment word and a detection word pair contained in each training corpus and a detection sentiment polarity of each detection sentiment word. According to a preset mask processing rule, mask process is performed on the detection sentiment word and the detection word pair of the training corpus to generate a masked corpus. Then, encoding process is performed on the masked corpus by using a preset encoder to generate feature vectors of the training corpus, and decoding process is performed on the feature vectors by using a preset decoder to determine the prediction sentiment word and the prediction word pair contained in the training corpus, and a prediction sentiment polarity of the prediction sentiment word. The preset encoder and the preset decoder are updated according to the difference between the prediction sentiment word and the detection sentiment word, the difference between the prediction word pair and the detection word pair, and the difference between the prediction sentiment polarity of the prediction sentiment word and the detection sentiment polarity of the detection sentiment word. Therefore, through integration of statistically calculated sentimental knowledge, such as, the sentiment word and its corresponding sentiment polarity, the comment point and sentiment word pair during the model pre-training process, and by designing target functions corresponding to the sentiment word, the sentiment polarity and the word pair respectively, the update of the model is guided, so that not only the pre-training model can better express data of a sentiment analysis direction, but also improve an effect of sentiment analysis. Moreover, through the plurality of target functions, the pre-training model is optimized and an ability of a pre-training model to learn complex text knowledge is improved.

In order to implement the above embodiments, the present disclosure also provides a pre-training apparatus for a sentiment analysis model.

Figure 4:
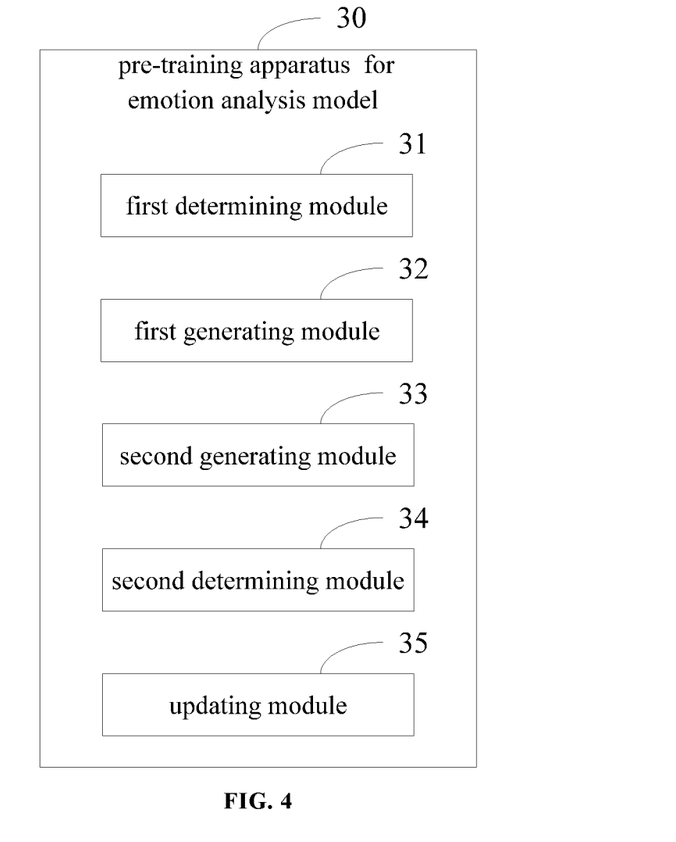
FIG. 4 is a schematic diagram of a pre-training apparatus for a sentiment analysis model according to embodiments of the present disclosure.

FIG. 4 is a schematic diagram of a pre-training apparatus for a sentiment analysis model according to embodiments of the present disclosure.

As illustrated in FIG. 4, the pre-training apparatus 30 for a sentiment analysis model includes: a first determining module 31, a first generating module 32, a second generating module 33, a second determining module 34, and an updating module 35.

The first determining module 31 is configured to, based on a given seed sentiment dictionary, perform sentimental knowledge detection on each training corpus in a training corpus set to determine a detection sentiment word and a detection word pair contained in the training corpus, in which each detection word pair contains a comment point and a sentiment word.

The first generating module 32 is configured to, according to a preset mask processing rule, perform mask process on the detection sentiment word and the detection word pair in each training corpus to generate a masked corpus.

The second generating module 33 is configured to, perform encoding process on the masked corpus by using a preset encoder to generate feature vectors corresponding to the training corpus.

The second determining module 34 is configured to perform decoding process on the feature vectors by using a preset decoder to determine a prediction sentiment word and a prediction word pair contained in the training corpus.

The updating module 35 is configured to update the preset encoder and the preset decoder according to a difference between the prediction sentiment word and the detection sentiment word, and a difference between the prediction word pair and the detection word pair.

In actual use, the pre-training apparatus for a sentiment analysis model according to the embodiments of the present disclosure may be configured in any electronic device to perform the aforementioned pre-training method for a sentiment analysis model.

According to the technical solution of the embodiments of the present disclosure, sentimental knowledge detection is performed on each training corpus in a training corpus set based on a given seed sentiment dictionary to determine a detection sentiment word and a detection word pair contained in the training corpus. According to a preset mask processing rule, mask process is performed on the detection sentiment word and the detection word pair of the training corpus to generate a masked corpus. Then, encoding process is performed on the masked corpus by using a preset encoder to generate feature vectors corresponding to the training corpus, and decoding process is performed on the feature vectors by using a preset decoder to determine a prediction sentiment word and a prediction word pair contained in the training corpus. The preset encoder and the preset decoder are updated according to a difference between the prediction sentiment word and the detection sentiment word, and a difference between the prediction word pair and the detection word pair. Therefore, through integration of statistically calculated sentimental knowledge in a pre-training process of the model, the pre-training model may better express data of a sentiment analysis direction, thus improving a technical effect of sentiment analysis.

In a possible implementation, the first determining module 31 includes:

a first determining unit, configured to, when a co-occurrence frequency of a j-th word segmentation of an i-th training corpus and a first seed sentiment word from the given seed sentiment dictionary in the training corpus set is greater than a first threshold, determine the j-th word segmentation to be the detection sentiment word in the i-th training corpus;

or, a second determining unit, configured to, when a similarity between a j-th word segmentation of an i-th training corpus and a second seed sentiment word from the given seed sentiment dictionary is greater than a second threshold, determine the j-th word segmentation to be the detection sentiment word in the i-th training corpus;

where i is an integer greater than 0 and less than or equal to N, j is a positive integer greater than 0 and less than or equal to K, N is a number of training corpus contained in the training corpus set, and K is a number of word segmentations contained in the j-th training corpus.

In a possible implementation, the first determining module 31 includes: an adding unit, configured to add the j-th word segmentation into the given seed sentiment dictionary.

In a possible implementation, the first determining module 31 includes: a third determining unit, configured to, based on a matching degree of a positional relation between each word segmentation in the i-th training corpus and the j-th word segmentation in the i-th training corpus with a preset part-of-speech template or a preset syntactic template, determine the detection word pair contained in the i-th training corpus.

In another possible implementation, the pre-training apparatus 30 for a sentiment analysis model includes: a third determining module, configured to, according to a co-occurrence frequency of each detection sentiment word and a third seed sentiment word from the given seed sentiment dictionary in the training corpus set, and a sentiment polarity of the third seed sentiment word, determine a detection sentiment polarity of the detection sentiment word.

Correspondingly, the second determining module 34 includes: a fourth determining unit, configured to perform the decoding process on the feature vectors by using the preset decoder to determine the prediction sentiment word and the prediction word pair contained in the training corpus, and a prediction sentiment polarity of the prediction sentiment word.

Correspondingly, the updating module 35 includes: an updating unit, configured to, according to the difference between the prediction sentiment word and the detection sentiment word, the difference between the prediction word pair and the detection word pair, and a difference between the prediction sentiment polarity of the prediction sentiment word and the detection sentiment polarity, update the preset encoder and the preset decoder.

In another possible implementation, the first generating module 32 includes: a mask processing unit, configured to, according to a preset ratio, perform the mask process on the detection sentiment word and the detection word pair in each training corpus.

It is noted that the foregoing explanation and description of the embodiments of the pre-training method for a sentiment analysis model shown in FIG. 1 and FIG. 3 are also applicable for the pre-training apparatus 30 for a sentiment analysis model of this embodiment, and details are not described here.

According to the technical solution of the embodiments of the present disclosure, sentimental knowledge detection is performed on each training corpus in a training corpus set based on a given seed sentiment dictionary to determine a detection sentiment word and a detection word pair contained in each training corpus and a detection sentiment polarity of each detection sentiment word. According to a preset mask processing rule, mask process is performed on the detection sentiment word and the detection word pair of the training corpus to generate a masked corpus. Then, encoding process is performed on the masked corpus by using a preset encoder to generate feature vectors of the training corpus, and decoding process is performed on the feature vectors by using a preset decoder to determine the prediction sentiment word and the prediction word pair contained in the training corpus, and a prediction sentiment polarity of the prediction sentiment word. The preset encoder and the preset decoder are updated according to the difference between the prediction sentiment word and the detection sentiment word, the difference between the prediction word pair and the detection word pair, and the difference between the prediction sentiment polarity of the prediction sentiment word and the detection sentiment polarity of the detection sentiment word. Therefore, through integration of statistically calculated sentimental knowledge, such as, the sentiment word and its corresponding sentiment polarity, the comment point and sentiment word pair during the model pre-training process, and by designing target functions corresponding to the sentiment word, the sentiment polarity and the word pair respectively, the update of the model is guided, so that not only the pre-training model can better express data of a sentiment analysis direction, but also improve an effect of sentiment analysis. Moreover, through the plurality of target functions, the pre-training model is optimized and an ability of a pre-training model to learn complex text knowledge is improved.

According to the embodiments of the present disclosure, the present disclosure also provides an electronic device and a readable storage medium.

Figure 5:
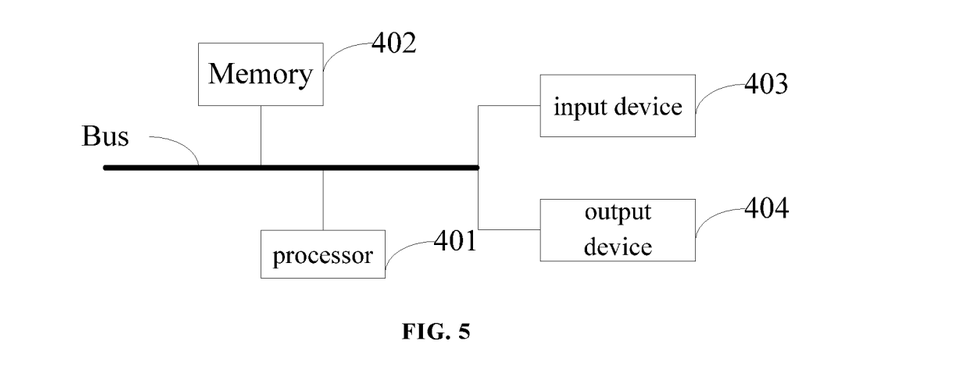
FIG. 5 is a schematic diagram of an electronic device according to embodiments of the present disclosure.

FIG. 5 is a block diagram of an electronic device used to implement the pre-training method for a sentiment analysis model according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 401, a memory 402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 401 is taken as an example in FIG. 5.

The memory 402 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the method according to the present disclosure.

As a non-transitory computer-readable storage medium, the memory 402 is configured to store non-transitory software programs, non-transitory computer executable programs and modules, such as program instructions/modules corresponding to the voice skill creation method in the embodiment of the present disclosure (For example, the first determining module 31, the first generating module 32, the second generating module 33, the second determining module 34, and the updating module 35 shown in FIG. 4). The processor 401 executes various functional applications and data processing of the server by running non-transitory software programs, instructions, and modules stored in the memory 402, that is, implementing the method in the foregoing method embodiment.

The memory 402 may include a storage program area and a storage data area, where the storage program area may store an operating system and application programs required for at least one function. The storage data area may store data created according to the use of the electronic device, and the like. In addition, the memory 402 may include a high-speed random access memory, and a non-transitory memory, such as at least one magnetic disk storage device, a flash memory device, or other non-transitory solid-state storage device. In some embodiments, the memory 402 may optionally include a memory remotely disposed with respect to the processor 401, and these remote memories may be connected to the electronic device through a network. Examples of the above network include, but are not limited to, the Internet, an intranet, a local area network, a mobile communication network, and combinations thereof.

The electronic device for implementing the pre-training method for a sentiment analysis model may further include an input device 403 and an output device 404. The processor 401, the memory 402, the input device 403, and the output device 404 may be connected through a bus or in other manners. In FIG. 5, the connection through the bus is taken as an example.

The input device 403 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the present disclosure, sentimental knowledge detection is performed on each training corpus in a training corpus set based on a given seed sentiment dictionary to determine a detection sentiment word and a detection word pair contained in the training corpus. According to a preset mask processing rule, mask process is performed on the detection sentiment word and the detection word pair of the training corpus to generate a masked corpus. Then, encoding process is performed on the masked corpus by using a preset encoder to generate feature vectors of the training corpus, and decoding process is performed on the feature vectors by using a preset decoder to determine a prediction sentiment word and a prediction word pair contained in the training corpus. The preset encoder and the preset decoder are updated according to a difference between the prediction sentiment word and the detection sentiment word, and a difference between the prediction word pair and the detection word pair. Therefore, through integration of statistically calculated sentimental knowledge in a pre-training process of a model, a pre-training model may better express data of a sentiment analysis direction, thus improving a technical effect of sentiment analysis.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A pre-training method for a sentiment analysis model, comprising:
   based on a given seed sentiment dictionary, performing sentimental knowledge detection on each training corpus in a training corpus set to determine a detection sentiment word and a detection word pair contained in the training corpus, wherein each detection word pair contains a comment point and a sentiment word;
   according to a preset mask processing rule, performing mask process on the detection sentiment word and the detection word pair in each training corpus to generate a masked corpus of the training corpus;
   performing encoding process on the masked corpus by using a preset encoder to generate feature vectors corresponding to the training corpus;
   performing decoding process on the feature vectors by using a preset decoder to determine a prediction sentiment word and a prediction word pair contained in the training corpus; and
   updating the preset encoder and the preset decoder according to a difference between the prediction sentiment word and the detection sentiment word, and a difference between the prediction word pair and the detection word pair.

2. The method according to claim 1, wherein performing the sentimental knowledge detection on each training corpus in the training corpus set based on the given seed sentiment dictionary comprises:
   when a co-occurrence frequency of a j-th word segmentation of an i-th training corpus and a first seed sentiment word from the given seed sentiment dictionary in the training corpus set is greater than a first threshold, determining the j-th word segmentation to be a detection sentiment word in the i-th training corpus;
   or,
   when a similarity between a j-th word segmentation of an i-th training corpus and a second seed sentiment word from the given seed sentiment dictionary is greater than a second threshold, determining the j-th word segmentation to be the detection sentiment word in the i-th training corpus;
   wherein i is an integer greater than 0 and less than or equal to N, j is a positive integer greater than 0 and less than or equal to K, N is a number of training corpus contained in the training corpus set, and K is a number of word segmentations contained in the j-th training corpus.

3. The method according to claim 2, after determining the j-th word segmentation to be the detection sentiment word in the i-th training corpus, further comprising:
   adding the j-th word segmentation into the given seed sentiment dictionary.

4. The method according to claim 2, after determining the j-th word segmentation to be the detection sentiment word in the i-th training corpus, further comprising:
   based on a matching degree of a positional relation between each word segmentation in the i-th training corpus and the j-th word segmentation in the i-th training corpus with a preset part-of-speech template or a preset syntactic template, determining the detection word pair contained in the i-th training corpus.

5. The method according to claim 1, after determining the detection sentiment word contained in each training corpus, further comprising:
   according to a co-occurrence frequency of each detection sentiment word and a third seed sentiment word from the given seed sentiment dictionary in the training corpus set, and a sentiment polarity of the third seed sentiment word, determining a detection sentiment polarity of the detection sentiment word;
   wherein performing the decoding process on the feature vectors by using the preset decoder, comprises:
   performing the decoding process on the feature vectors by using the preset decoder to determine the prediction sentiment word and the prediction word pair contained in the training corpus, and a prediction sentiment polarity of the prediction sentiment word; and
   wherein updating the preset encoder and the preset decoder comprises:
   according to the difference between the prediction sentiment word and the detection sentiment word, the difference between the prediction word pair and the detection word pair, and a difference between the prediction sentiment polarity and the detection sentiment polarity, updating the preset encoder and the preset decoder.

6. The method according to claim 1, wherein according to the preset mask processing rule, performing the mask process on the detection sentiment word and the detection word pair in each training corpus, comprises:
according to a preset ratio, performing the mask process on the detection sentiment word and the detection word pair in each training corpus.

7. An electronic device, comprising:
at least one processor; and
a memory communicatively connected to the at least one processor; wherein,
the memory stores instructions executable by the at least one processor, the instructions are executed by the at least one processor to enable the at least one processor to implement the method comprising:
based on a given seed sentiment dictionary, performing sentimental knowledge detection on each training corpus in a training corpus set to determine a detection sentiment word and a detection word pair contained in the training corpus, wherein each detection word pair contains a comment point and a sentiment word;
according to a preset mask processing rule, performing mask process on the detection sentiment word and the detection word pair in each training corpus to generate a masked corpus of the training corpus;
performing encoding process on the masked corpus by using a preset encoder to generate feature vectors corresponding to the training corpus;
performing decoding process on the feature vectors by using a preset decoder to determine a prediction sentiment word and a prediction word pair contained in the training corpus; and
updating the preset encoder and the preset decoder according to a difference between the prediction sentiment word and the detection sentiment word, and a difference between the prediction word pair and the detection word pair.

8. The electronic device according to claim 7, wherein performing the sentimental knowledge detection on each training corpus in the training corpus set based on the given seed sentiment dictionary comprises:
when a co-occurrence frequency of a j-th word segmentation of an i-th training corpus and a first seed sentiment word from the given seed sentiment dictionary in the training corpus set is greater than a first threshold, determining the j-th word segmentation to be a detection sentiment word in the i-th training corpus;
or,
when a similarity between a j-th word segmentation of an i-th training corpus and a second seed sentiment word from the given seed sentiment dictionary is greater than a second threshold, determining the j-th word segmentation to be the detection sentiment word in the i-th training corpus;
wherein i is an integer greater than 0 and less than or equal to N, j is a positive integer greater than 0 and less than or equal to K, N is a number of training corpus contained in the training corpus set, and K is a number of word segmentations contained in the j-th training corpus.

9. The electronic device according to claim 8, after determining the j-th word segmentation to be the detection sentiment word in the i-th training corpus, the method further comprising:
adding the j-th word segmentation into the given seed sentiment dictionary.

10. The electronic device according to claim 8, after determining the j-th word segmentation to be the detection sentiment word in the i-th training corpus, the method further comprising:
based on a matching degree of a positional relation between each word segmentation in the i-th training corpus and the j-th word segmentation in the i-th training corpus with a preset part-of-speech template or a preset syntactic template, determining the detection word pair contained in the i-th training corpus.

11. The electronic device according to claim 7, after determining the detection sentiment word contained in each training corpus, the method further comprising:
according to a co-occurrence frequency of each detection sentiment word and a third seed sentiment word from the given seed sentiment dictionary in the training corpus set, and a sentiment polarity of the third seed sentiment word, determining a detection sentiment polarity of the detection sentiment word;
wherein performing the decoding process on the feature vectors by using the preset decoder, comprises:
performing the decoding process on the feature vectors by using the preset decoder to determine the prediction sentiment word and the prediction word pair contained in the training corpus, and a prediction sentiment polarity of the prediction sentiment word; and
wherein updating the preset encoder and the preset decoder comprises:
according to the difference between the prediction sentiment word and the detection sentiment word, the difference between the prediction word pair and the detection word pair, and a difference between the prediction sentiment polarity and the detection sentiment polarity, updating the preset encoder and the preset decoder.

12. The electronic device according to claim 7, wherein according to the preset mask processing rule, performing the mask process on the detection sentiment word and the detection word pair in each training corpus, comprises:
according to a preset ratio, performing the mask process on the detection sentiment word and the detection word pair in each training corpus.

13. A non-transitory computer-readable storage medium storing computer instructions, wherein the computer instructions are configured to cause a computer to implement the method comprising:
based on a given seed sentiment dictionary, performing sentimental knowledge detection on each training corpus in a training corpus set to determine a detection sentiment word and a detection word pair contained in the training corpus, wherein each detection word pair contains a comment point and a sentiment word;
according to a preset mask processing rule, performing mask process on the detection sentiment word and the detection word pair in each training corpus to generate a masked corpus of the training corpus;
performing encoding process on the masked corpus by using a preset encoder to generate feature vectors corresponding to the training corpus;

performing decoding process on the feature vectors by using a preset decoder to determine a prediction sentiment word and a prediction word pair contained in the training corpus; and updating the preset encoder and the preset decoder according to a difference between the prediction sentiment word and the detection sentiment word, and a difference between the prediction word pair and the detection word pair.

14. The non-transitory computer-readable storage medium according to claim 13, wherein performing the sentimental knowledge detection on each training corpus in the training corpus set based on the given seed sentiment dictionary comprises:

when a co-occurrence frequency of a j-th word segmentation of an i-th training corpus and a first seed sentiment word from the given seed sentiment dictionary in the training corpus set is greater than a first threshold, determining the j-th word segmentation to be a detection sentiment word in the i-th training corpus; or, when a similarity between a j-th word segmentation of an i-th training corpus and a second seed sentiment word from the given seed sentiment dictionary is greater than a second threshold, determining the j-th word segmentation to be the detection sentiment word in the i-th training corpus;

wherein i is an integer greater than 0 and less than or equal to N, j is a positive integer greater than 0 and less than or equal to K, N is a number of training corpus contained in the training corpus set, and K is a number of word segmentations contained in the j-th training corpus.

15. The non-transitory computer-readable storage medium according to claim 14, after determining the j-th word segmentation to be the detection sentiment word in the i-th training corpus, the method further comprising:

adding the j-th word segmentation into the given seed sentiment dictionary.

16. The non-transitory computer-readable storage medium according to claim 14, after determining the j-th word segmentation to be the detection sentiment word in the i-th training corpus, the method further comprising:

based on a matching degree of a positional relation between each word segmentation in the i-th training corpus and the j-th word segmentation in the i-th training corpus with a preset part-of-speech template or a preset syntactic template, determining the detection word pair contained in the i-th training corpus.

17. The non-transitory computer-readable storage medium according to claim 13, after determining the detection sentiment word contained in each training corpus, the method further comprising:

according to a co-occurrence frequency of each detection sentiment word and a third seed sentiment word from the given seed sentiment dictionary in the training corpus set, and a sentiment polarity of the third seed sentiment word, determining a detection sentiment polarity of the detection sentiment word;

wherein performing the decoding process on the feature vectors by using the preset decoder, comprises:

performing the decoding process on the feature vectors by using the preset decoder to determine the prediction sentiment word and the prediction word pair contained in the training corpus, and a prediction sentiment polarity of the prediction sentiment word; and wherein updating the preset encoder and the preset decoder comprises:

according to the difference between the prediction sentiment word and the detection sentiment word, the difference between the prediction word pair and the detection word pair, and a difference between the prediction sentiment polarity and the detection sentiment polarity, updating the preset encoder and the preset decoder.

18. The non-transitory computer-readable storage medium according to claim 13, wherein according to the preset mask processing rule, performing the mask process on the detection sentiment word and the detection word pair in each training corpus, comprises:

according to a preset ratio, performing the mask process on the detection sentiment word and the detection word pair in each training corpus.

\* \* \* \* \*